(12) United States Patent
Cao

(10) Patent No.: US 11,599,344 B2
(45) Date of Patent: Mar. 7, 2023

(54) COMPUTER ARCHITECTURE FOR EXECUTING QUANTUM PROGRAMS

(71) Applicant: Zapata Computing, Inc., Boston, MA (US)

(72) Inventor: Yudong Cao, Cambridge, MA (US)

(73) Assignee: Zapata Computing, Inc., Boston, MA (US)

( * ) Notice: Subject to any disclaimer, the term of this patent is extended or adjusted under 35 U.S.C. 154(b) by 61 days.

(21) Appl. No.: 17/011,324

(22) Filed: Sep. 3, 2020

(65) Prior Publication Data

US 2021/0064350 A1 Mar. 4, 2021

Related U.S. Application Data

(60) Provisional application No. 62/895,172, filed on Sep. 3, 2019.

(51) Int. Cl.
*G06F 8/41* (2018.01)
*G06N 10/00* (2022.01)

(52) U.S. Cl.
CPC ............. *G06F 8/443* (2013.01); *G06F 8/447* (2013.01); *G06N 10/00* (2019.01)

(58) Field of Classification Search
CPC .......... G06F 8/443; G06F 8/447; G06N 10/00
USPC ........................................................ 717/151
See application file for complete search history.

(56) References Cited

U.S. PATENT DOCUMENTS

| | | | | |
|---|---|---|---|---|
| 7,987,458 B2 * | 7/2011 | Rothman | ............ | G06F 9/44557 717/151 |
| 8,898,628 B2 * | 11/2014 | Raza | ........................ | G06F 8/35 717/107 |
| 9,098,292 B1 * | 8/2015 | Zhang | ....................... | G06F 8/35 |
| 2012/0254586 A1 | 10/2012 | Amin et al. | | |
| 2016/0196112 A1 * | 7/2016 | Edwards | ................... | G06F 8/30 717/107 |
| 2018/0276556 A1 | 9/2018 | Garrison et al. | | |
| 2019/0042970 A1 * | 2/2019 | Zou | ........................ | G06N 10/00 |
| 2019/0340532 A1 * | 11/2019 | Ducore | .................... | G06F 8/443 |
| 2019/0378047 A1 * | 12/2019 | Pistoia | .................... | G06F 17/14 |
| 2020/0310908 A1 * | 10/2020 | Hogaboam | ............. | G06F 11/10 |

(Continued)

FOREIGN PATENT DOCUMENTS

| | | |
|---|---|---|
| CN | 108536536 A | 9/2018 |
| CN | 110187885 A | 8/2019 |
| EP | 4026069 A1 | 7/2022 |
| WO | 2021046184 A1 | 3/2021 |

OTHER PUBLICATIONS

Title: Quantum circuit optimization by Hadamard gate reduction, author: N Abdessaied, Published on 2014.*

(Continued)

*Primary Examiner* — Chameli Das
(74) *Attorney, Agent, or Firm* — Blueshift IP, LLC; Robert Plotkin

(57) ABSTRACT

A computer system, designed according to a particular architecture, compiles and execute a general quantum program. Computer systems designed in accordance with the architecture are suitable for use with a variety of programming languages and a variety of hardware backends. The architecture includes a classical computer and a quantum device (which may be remote from the local computer) which includes both classical execution units and a quantum processing unit (QPU).

16 Claims, 7 Drawing Sheets

(56) References Cited

U.S. PATENT DOCUMENTS

| | | | |
|---|---|---|---|
| 2020/0327439 A1* | 10/2020 | Greenberg | B82Y 10/00 |
| 2020/0410759 A1* | 12/2020 | Murphy-Chutorian | G06T 19/006 |
| 2021/0374594 A1* | 12/2021 | Langer | G06N 10/20 |
| 2022/0045425 A1* | 2/2022 | Tran | G10L 25/51 |

OTHER PUBLICATIONS

Title: Layout optimization for quantum circuits with linear nearest neighbor architectures, author: M Pedram, Published on 2016.*

Title: Running a quantum circuit at the speed of data, athor: N Isailovic, published on 2008.*

Title: ScaffCC: A framework for compilation and analysis of quantum computing programs, author: A JavadiAbhari, published on 2014.*

Title: A practical quantum instruction set architecture, author: RS Smith, published on 2016.*

Haner, T., et al., "A Software Methodology for Compiling Quantum Programs", <https://arxiv.org/pdf/1604.01401v2, pp. 1-14 (May 11, 2016).

International Search Report & Written Opinion issued in international patent application No. PCT/US2020/049148 dated Dec. 22, 2020, 8 pages.

* cited by examiner

COMPUTER ARCHITECTURE FOR EXECUTING QUANTUM PROGRAMS

BACKGROUND

The conventional way of understanding quantum computation is that a specific instance of a quantum algorithm consists of executing a quantum circuit, which is a sequence of elementary quantum gates, followed by performing measurement on all of the qubits. Most well-known quantum algorithms, such as Shor's algorithm, Grover's search, and quantum phase estimation are described and understood in this way. For Noisy Intermediate Scale Quantum (NISQ) devices, many variational algorithms such as Variational Quantum Eigensolver (VQE), Quantum Approximate Optimization Algorithm (QAOA), and some of the quantum machine learning schemes (e.g., variational circuit classifier and quantum autoencoder) are also described and understood in this way. When the quantum algorithm is executed, one first loads the gate sequence onto some classical control electronics, then executes that gate sequence, and finally obtains the measurement results in the form of classical bit strings to be returned to the classical computer. This paradigm essentially assumes that instructions executed on the quantum processor are sequential in nature.

Although this conventional sequential quantum gate conceptualization encompasses a significant set of quantum algorithms, it excludes several classes of quantum algorithms of vast importance. Examples include quantum error correction schemes, iterative or Bayesian phase estimation schemes, repeat-until-success circuits, and measurement-based quantum computing schemes. These algorithms require a more general conceptualization of quantum computation, namely that any instance of a quantum algorithm may be represented as a quantum program, which is essentially a classical program, executed on a classical computer, punctuated by calls to the quantum device. A quantum program may contain control flows, such as conditional branching and looping, whereby a classical processing unit interacts closely with the quantum device to provide such control flow implementations.

Current progress in quantum computing has produced components for each step of the workflow of physically implementing quantum algorithms, ranging from:

- programming languages and interfaces (such as pyquil, qiskit, cirq, and Q#);
- compilation techniques for programs involving quantum instructions (such as Q#);
- transpilers to physical hardware (such as different types of physical qubits and different connectivity and noise profiles); and
- classical electronics (such as CPUs and FPGAs) for controlling and executing physical signals that are actuated on the quantum system.

The variety in the programming languages available for representing quantum algorithms, as well as the diversity of physical quantum devices, adds to the complexity of the issue.

SUMMARY

A computer system, designed according to a particular architecture, compiles and execute a general quantum program. Computer systems designed in accordance with the architecture are suitable for use with a variety of programming languages and a variety of hardware backends. The architecture includes a classical computing device and a quantum computing device (which may be remote from the local computer) which includes both classical execution units and a quantum processing unit (QPU).

DETAILED DESCRIPTION

Figure 1:
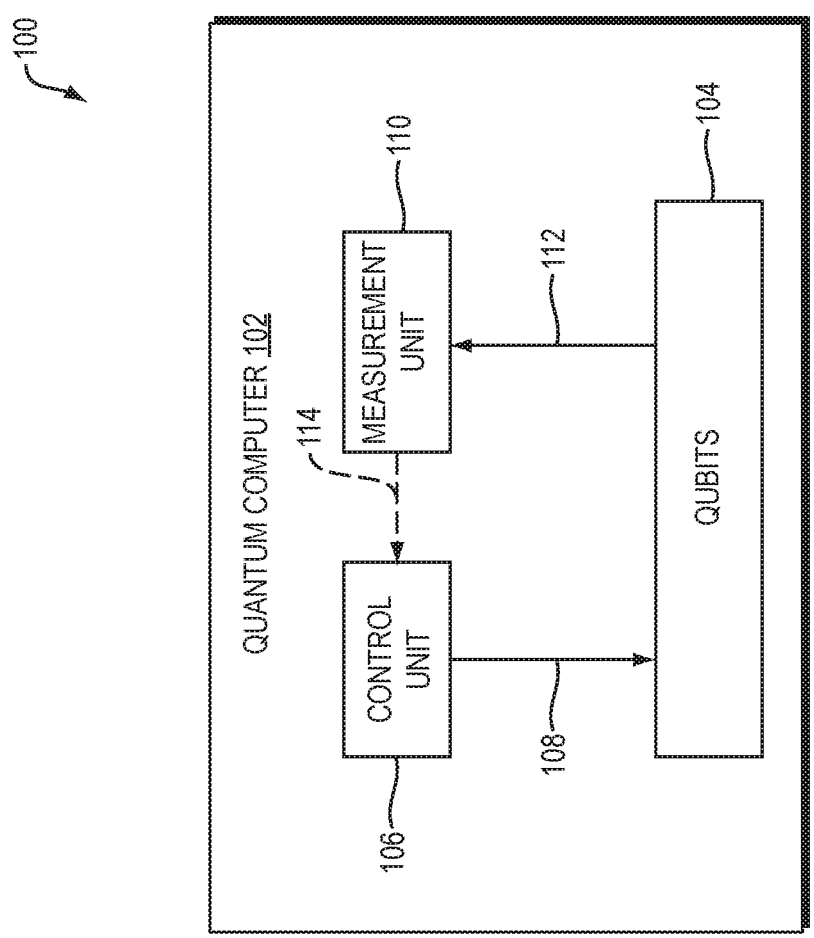
FIG. 1 is a diagram of a quantum computer according to one embodiment of the present invention.

A computer system compiles and execute a general quantum program. Embodiments of the present invention may include a classical computing device and a quantum computing device (which may be remote from the classical computing device) which includes both classical units and a quantum processing unit (QPU).

Embodiments of the present invention include a method for compiling program instructions utilizing quantum computers. The method uses a classical computer to optimize first intermediate code, wherein the first intermediate code defines a plurality of processes. The first intermediate code may be generated by a compiler front-end for a computer programming language. An optimization process may be applied to the intermediate code, comprising: (i) identifying, based on the first intermediate code, a subset of the plurality of processes which are suited to execute on a quantum computing device, (ii) generating a description of a quantum circuit to execute the subset of the plurality of processes, (iii) optimizing the description of the quantum circuit to produce a description of an optimized quantum circuit, and (iv) identifying a classical subset of the plurality of processes which are suited to execute on a classical computing device.

Embodiments of the present invention are directed to a computer-implemented system and method for compiling and executing a general quantum program. The framework is adaptable to use with a variety of programming languages and a variety of hardware backends. Computer systems implemented in accordance with the architecture may, for example, include:

1. A classical computer (also referred to herein as a "local computer" and a "classical computing device"), such as a classical laptop computer, desktop computer, or a computer accessible via cloud service. As these examples illustrate, the classical computer may be local to a user who uses the classical computer, or remote from the user, such as being accessible to the user over a computer network (e.g., the Internet). As described in further detail below, the classical computer may include one or more processors and one or more computer-readable memories containing computer program instructions that are executable by the one or more processors.

2. A remote hardware system, which may be or include a "quantum computer" and/or a "hybrid quantum-classical computer" as those terms are used herein. The remote hardware system may, for example, be remote from the classical computer. For example, the classical computer may be coupled to the remote hardware system over a network, such as an intranet or the Internet. The connection between the classical computer and the remote hardware system may, for example, result in a high latency time in communication (on the scale of tens of milliseconds) between the classical computer and the remote hardware system, in comparison with the decoherence time of physical qubits on the quantum device (on the scale of tens of microseconds). As this implies, the latency time in communication between the classical computer and the remote hardware system may, for example, be a thousand times or more greater than the decoherence time of the physical qubits on the quantum device. The remote hardware system may include, for example, any one or more of the following:
   a. Classical execution hardware, which may, for example, be or include a "classical computer" as that term is used herein. For example, the classical execution hardware may include at least one processor and at least one non-transitory computer-readable medium containing computer program instructions which are executable by the processor(s) to perform methods defined by the computer program instructions. The classical execution hardware may, for example, be remote from the quantum processing unit (QPU) described below, such as by being coupled to the QPU over a network, such as an intranet or the Internet. Alternatively, for example, the classical execution hardware may be local to the QPU, such as by being connected by one or more wires or buses. The classical execution hardware may, for example, include classical electronics that execute the classical control and execution functions of quantum programs, such as any one or more of the following:
      i. One or more Central Processing Units (CPUs), which may be designed to perform, and actually perform, functions such as general process coordination and transpilation.
      ii. One or more Graphical Processing Units (GPUs), which may be designed to perform, and actually perform, functions such as fast numerical evaluation of integrals and linear algebra operations.
      iii. One or more Neural Processing Units (NPUs), which may be designed to perform, and actually perform, functions such as rapid training and execution of machine learning algorithms.
      iv. One or more Field Programmable Gate Arrays (FPGAs), which may be designed to perform, and which may actually perform, functions such as generating, transmitting, and receiving signals for the physical quantum hardware.
      v. One or more Application Specific Integral Circuits (ASICs), which may be designed to perform, and which may actually perform functions such as fast evaluation of functions of a fixed nature.
   b. A Quantum Processing Unit (QPU), which may include physical hardware for realizing quantum computation, such as ion traps, superconducting circuits, and photonic circuits. The QPU may include some or all of the elements of a "quantum computer" or "quantum computing device," as those terms are used herein.

Figure 4A:
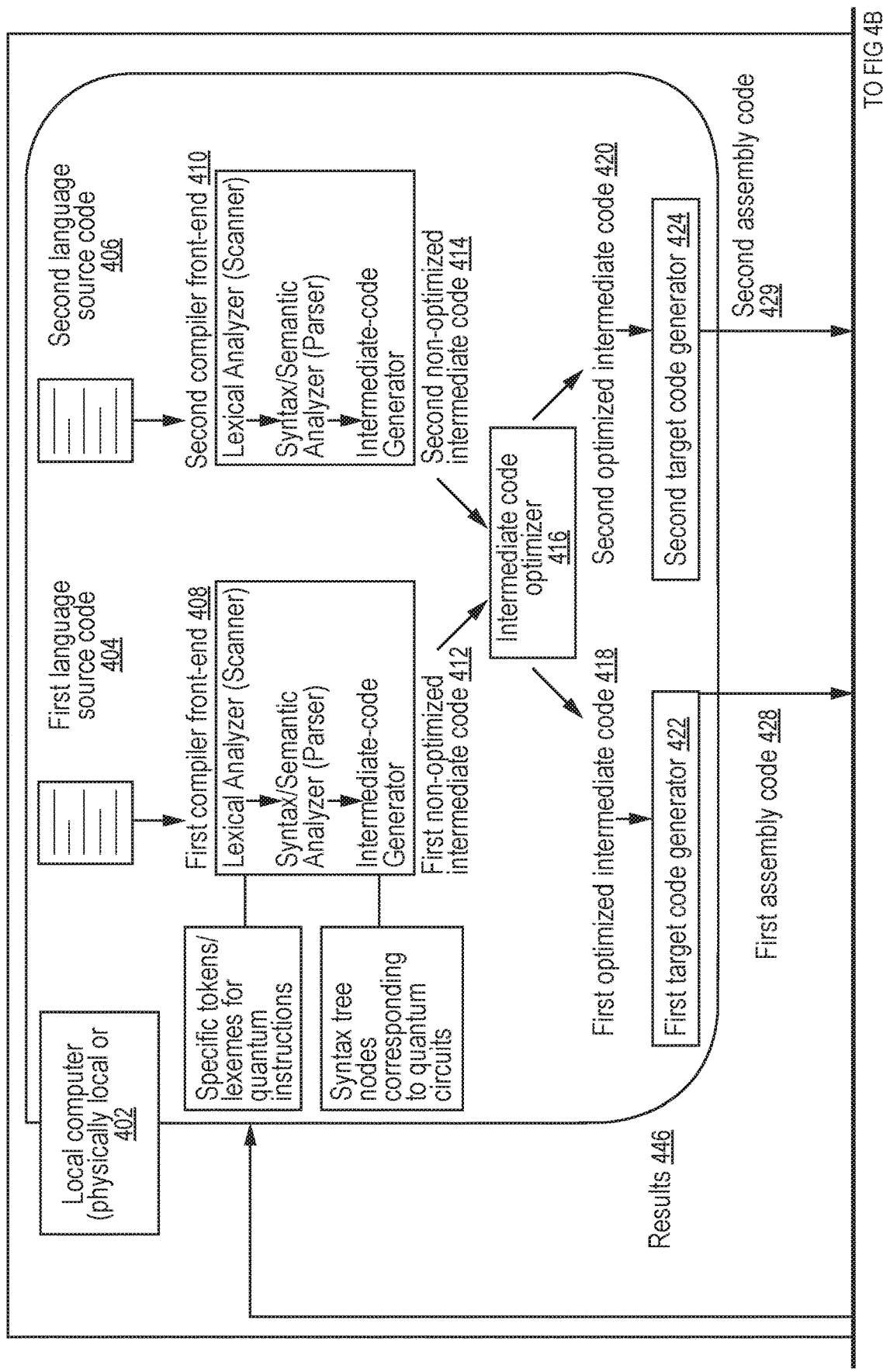
FIGS. 4A-4B are diagram of a computer system for executing a quantum program according to one embodiment of the present invention.
Figure 4B:
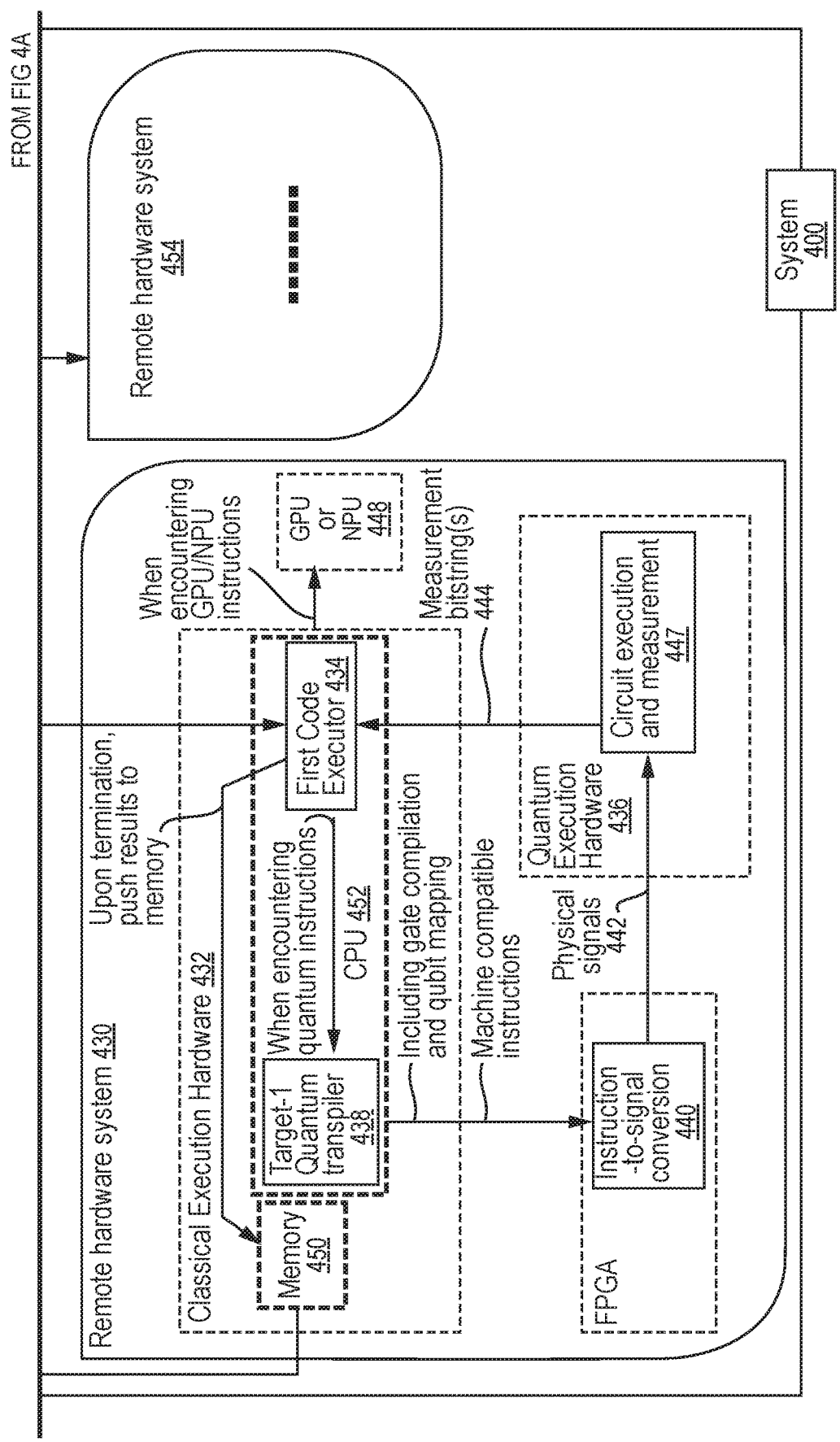

A system 400 implementing a general workflow of one embodiment of the present invention is shown in FIGS. 4A-4B. The system 400 includes a local computer 402. The local computer 402 may be any kind of computer, such as any kind of computer disclosed herein. For example, the local computer 402 may include at least one processor and at least one non-transitory computer-readable medium containing computer program instructions which are executable by the processor(s) to perform methods defined by the computer program instructions. The local computer 402 includes at least one quantum program, such as quantum program 404 or quantum program 406, each or both of which may be in the form of source code written in a particular computer programming language. The quantum programs 404 and 406 (and any other instructions and/or data shown in FIGS. 4A-4B) may be stored in one or more non-transitory computer-readable media in or coupled to the local computer 402.

The use of the term "local" in connection with the computer 402 is merely an example and does not constitute a limitation of the present invention. For example, although the computer 402 may be local to a user of the computer 402, this is not a requirement of the present invention. Alternatively, for example, a user of the computer 402 may access (e.g., provide input to and/or receive output from) the computer 402 remotely, e.g., over a network. Similarly, other devices (e.g., the remote hardware systems 430 and 454) may be local to the local computer 402 (e.g., by being contained with the local computer 402 or by being connected locally to the computer 402, such as via a bus) or remote from the local computer 402 (e.g., by being connected to the computer 402 over a network, such as the Internet).

The local computer 402 includes at least one compiler front-end, which may, for example, be a software application executing on the local computer 402. Each such compiler front-end may be designed to compile source code written in a particular corresponding computer programming language. For example, in FIGS. 4A-4B, the local computer 402 includes a first compiler front-end 408 designed to compile source code written in a first corresponding computer programming language (e.g., the computer programming language in which quantum program 404 is written) and a second compiler front-end 410 designed to compile source code written in a second corresponding computer programming language (e.g., the computer programming language in which quantum program 406 is written). The particular number of compiler front ends shown in FIGS. 4A-4B is merely an example and does not constitute a limitation of the present invention. Systems implemented according to embodiments of the present invention may have more or fewer compiler front-ends than shown in FIGS. 4A-4B. Furthermore, as the example of FIGS. 4A-4B illustrates, the system 400 may include a plurality of compiler front-ends which are designed to compile source code written in different computer programming languages than each other. For example, the first programming language, in which the quantum program 404 is written, may be a different programming language than the second programming language, in which the quantum program 406 is written. Each such programing language may include instructions and/or a library suitable for describing instances of classical and/or quantum algorithms.

As will be described in more detail below, the compiler front-end 408 may compile the quantum program 404 to produce non-optimized intermediate code 412 as output. Such compilation may include identifying portions of the quantum program 404 that will be eventually executed on a remote hardware system (e.g., the remote computing system 430 or the remote hardware system 460). The compiler front-end 408 may communicate such identified portions of the quantum program 404 to other components of the system 400 in any of a variety of ways, such as by generating and storing data (e.g., in the non-optimized intermediate code 412) identifying the identified portions of the quantum program 404.

The compiler front-end 408 may identify the portions of the quantum program 404 that will be executed on the remote computing device 430 in any of a variety of ways. For example, the compiler front-end 408 may include a lexical analyzer (scanner), which may perform any functions of a conventional classical lexical analyzer, such as generating, in the non-optimized intermediate code 412, tokens corresponding to classical instructions in the quantum program 404. In addition, the lexical analyzer 408 may generate, in the non-optimized intermediate code 412, tokens corresponding to quantum instructions in the quantum program 404. As a result, the non-optimized intermediate code 412 may include both tokens that were generated based on, and correspond to, classical instructions in the quantum program 404, and tokens that were generated based on, and correspond to, quantum instructions in the quantum program 404. The lexical analyzer 408 may generate and store data (e.g., in the non-optimized intermediate code 412) indicating, for some or all of the tokens in the non-optimized intermediate code 412, whether that token was generated based on, and corresponds to a classical instruction in the quantum program 404 or a quantum instruction in the quantum program 404. For example, a token corresponding to a quantum instruction in the quantum program 404 may be associated with data (e.g., in the non-optimized intermediate code 412) indicating that the token represents a quantum instruction (e.g., a "quantum" label). Similarly, a token corresponding to a classical instruction in the quantum program 404 may be associated with data (e.g., in the non-optimized intermediate code 412) indicating that the token represents a classical instruction (e.g., a "classical" label).

The compiler front-end 408 may also include a syntax/semantic analyzer (parser), which may generate a syntax tree, in which tree nodes corresponding to quantum instructions may be marked as "quantum," such as by carrying forward any "classical" and/or "quantum" labels from the tokens from which the syntax tree was generated. Otherwise, the parser may, for example, use conventional techniques to perform its functions.

The compiler front-end 408 may also include an intermediate-code generator, which may generate the non-optimized intermediate code 412, as a result of which the non-optimized intermediate code 412 may contain information about which instructions are quantum and which are classical, such as by carrying forward any "classical" and/or "quantum" labels from the tokens and/or syntax tree. Otherwise, the intermediate-code generator may, for example, use conventional techniques to perform its functions.

Any of the functions disclosed above, or elsewhere herein, in connection with the compiler front-end 408, apply similarly to the compiler front-end 410. In general, for example, the compiler front-end 410 may compile the quantum program 406 to produce non-optimized intermediate code 414 as output in any of the ways disclosed herein in connection with the compiler front-end 408.

The non-optimized intermediate code 412 produced by the compiler front-end 408 may, for example, be essentially identical regardless of the programming language in which the input source code (e.g., quantum program 404 or quantum program 406) was written.

The system 400 also includes an intermediate code optimizer 416, which receives the first non-optimized intermediate code 412 as input, and performs improvements on the received non-optimized intermediate code 412 that help execution of the resulting code on a CPU, thereby producing first optimized intermediate code 418. Similarly, the intermediate code optimizer 416 may receive the second non-optimized intermediate code 414 as input, and perform improvements on the received non-optimized intermediate code 414 that helps execution of the resulting code on a classical computer, thereby producing second optimized intermediate code 420. Although only a single intermediate code optimizer 416 is shown in FIGS. 4A-4B, this is merely an example and not a limitation of the present invention. For example, the system 400 may include a plurality of intermediate code optimizers.

The optimization performed by the intermediate code optimizer 416 may include additional optimizations, such as performing simple optimization on quantum circuits defined by the non-optimized intermediate code 412 and/or non-optimized intermediate code 414 (e.g., identity gate removal and gate simplification using known circuit identities). These optimizations may be implemented as sequential stages (such as in ProjectQ). Also, if computational resources permit and sufficient information is known about the remote computing device 430, the optimization performed by the intermediate code optimizer 416 may include performing transpiling on the non-optimized intermediate code 412 and/or the non-optimized intermediate code 414.

The local computer 402 may also include a first target code generator 422 and a first remote hardware system 430. The first target code generator 422 receives the first optimized intermediate code 418 as input and generates, based on the first optimized intermediate code 418, first assembly code 428 that is compatible with the first remote hardware system 430 on which the first assembly code 428 is to be executed. The first assembly code 428 may include both first classical assembly code for execution by first classical execution hardware 432 and first quantum assembly code for execution by the first quantum execution hardware 436. The local computer 402 may provide (e.g., transmit over a network) the first assembly code 428 to the first remote computing device 430.

The local computer 402 may also include a second target code generator 424 and a second remote hardware system 460. The second target code generator 424 receives the second optimized intermediate code 420 as input and generates, based on the second optimized intermediate code 420, second assembly code 429 that is compatible with the second remote hardware system 460 on which the second assembly code 429 is to be executed. Although not shown in FIGS. 4A-4B, the remote hardware system 460 may include components that are the same as or similar to the remote hardware system 430, and may perform the same functions as the remote hardware system 430, but in connection with the second assembly code 429. The remote hardware system 430 may include classical execution hardware 432, which may, for example, be or include a "classical computer" or a "classical computing device," as those terms are used herein. For example, the classical execution hardware 432 may include a CPU 452 or other processor and a memory 450 (e.g., non-transitory computer-readable medium). The memory 450 may contain computer program instructions, which the CPU 452 may execute. For example, the first code executor 434 and first quantum transpiler 438 may be implemented as computer program instructions stored in the memory 450, and may be executed by the CPU 452 to perform the functions disclosed herein.

In response to receiving the first assembly code 428, the classical execution hardware 432 of the first remote hardware system 430 may spin up a process which is referred to herein as the first code executor 434. The first code executor 434 examines instructions in the assembly code 428 in sequence and, for each sequence of instructions: (1) determines which hardware (e.g., the classical execution hardware 432 or the quantum execution hardware 436) is to be used to execute that sequence of instructions (such as by identifying whether the sequence of instructions was marked as "classical" or "quantum" in the first optimized intermediate code 418 and/or in the assembly code 428); and (2) providing the sequence of instructions to the identified hardware (e.g., the classical execution hardware 432 or the quantum execution hardware 436). For example, in general, the first code executor 434 may provide instructions in the assembly code 428 marked as "quantum" to the quantum execution hardware 436 for execution, and may provide instructions marked as "classical" (or not marked as "quantum") to the first classical execution hardware 432 (e.g., first CPU) for execution.

For example, if the first code executor 434 determines that a sequence of instructions is marked as "quantum" (e.g., a sequence of instructions defining a quantum circuit), then the first code executor 434 may provide the sequence of instructions to a first quantum transpiler 438 (which may be another process running on the same CPU 452, or a process running on a different CPU on the first remote hardware system 430). The first quantum transpiler 438 performs operations on the quantum instructions that render them compatible with the gate set and qubit connectivity of the first quantum execution hardware 436, and in some cases the first quantum transpiler 438 may also optimize the quantum instructions so that the noise profile of the first quantum execution hardware 436 is fully accounted for. The transpiled, machine compatible instructions may then be provided to a first electronic circuit 440 (such as an FPGA), which may convert the instructions into physical signals 442, which may then be provided to the first quantum execution hardware 436 for execution. The first quantum execution hardware 436 may include an execution and measurement circuit 447, which may execute the instructions represented by the physical signals 442. Upon execution, the execution and measurement circuit 447 may perform one or more measurement operations on some or all of the qubits in the quantum execution hardware 436 and return a first set of bitstrings 444 representing the results of the measurement operation(s). The remote hardware system 430 (e.g., using the first electronic circuit 440 (e.g., FPGA)) may process the measurement bitstrings 444 to produce a first result signal that is returned to the first code executor 434 in the classical execution hardware 432 to advance code execution. For example, the first result may be a single bit indicating True or False so that the first code executor 434 may decide which conditional branch to enter next.

For certain applications, the system 400 may perform tasks such as numerically evaluating integrals and matrix computations. In these cases the first code executor 434 may forward the instructions to a first GPU 448 on the first quantum computing device 448 to obtain first results 446. In other cases, the system 400 may need to rapidly train and execute neural networks to assist the execution of the quantum program. In these cases, the first code executor 434 may forward the instructions to a first neural processing unit (NPU) 448 on the first remote hardware system 430 to obtain results 446.

When the first code executor 434 has terminated the execution of the first assembly code 428, the results 446 (both final and intermediate results from the quantum execution hardware 436) may be pushed into the memory 450 and subsequently transmitted back to the local computer 402. This completes the full workflow of executing the first quantum program 404.

Figure 5:
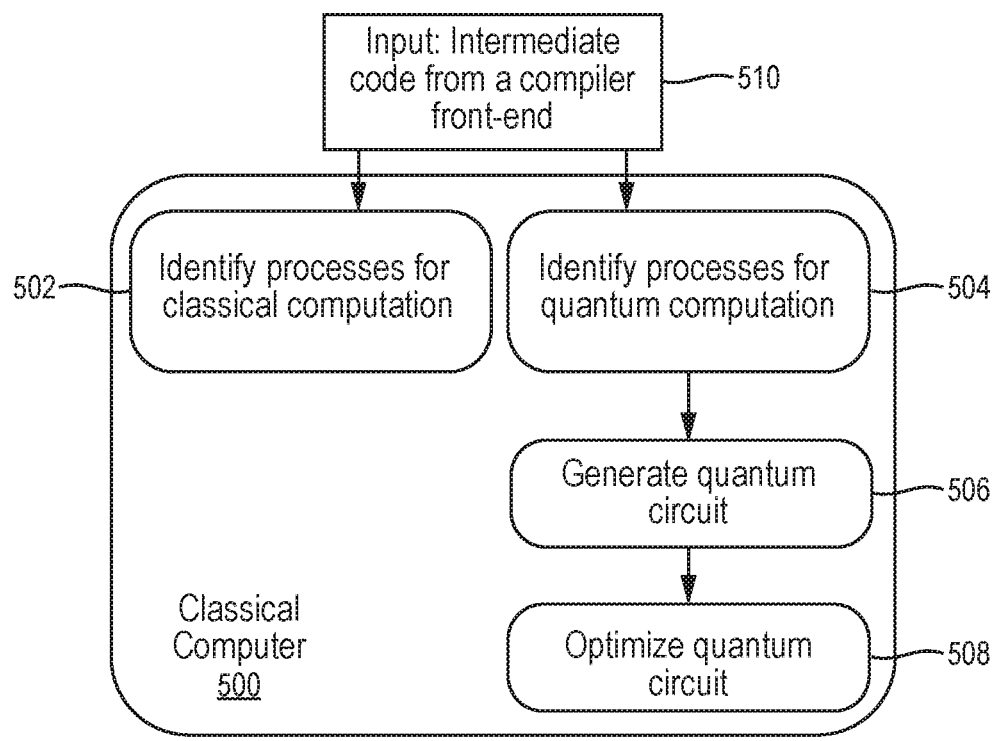
FIG. 5 is a diagram of a classical computer for implementing part of the system of FIGS. 4A-4B according to one embodiment of the present invention.

Referring to FIG. 5, a classical computer 500 is shown for implementing at least part of the system 400 of FIGS. 4A-4B according to one embodiment of the present invention. For example, the classical computer 500 may implement some or all of the local computer 402 of FIGS. 4A-4B.

The classical computer 500 may receive, as input, intermediate code 510 from a first compiler front end, where the compiler front end is for a first programming language. For example, the intermediate code 510 may be or include the intermediate code 418 or the intermediate code 420 of FIGS. 4A-4B, and the first programming language may be the language in which the quantum program 404 is written.

The first intermediate code may define a plurality of processes. The classical computer 500 may: (A) optimize the intermediate code 510, thereby creating optimized intermediate code. The optimizing may include: (A)(1) identifying 504, based on the first intermediate code, a first subset of the plurality of processes which are suited to execute on quantum execution hardware; (A)(2) generating 506 a description of a quantum circuit to execute the first subset of the plurality of processes; (A)(3) optimizing 508 the description of the quantum circuit to produce a description of an optimized quantum circuit (such as by using the intermediate code optimizer 416); and (A)(4) identifying 502 a second subset of the plurality of processes which are suited to execute on classical execution hardware.

The operation (A)(3) may include compiling the description of the quantum circuit to produce the description of the optimized quantum circuit. The method may further include: (B) generating, based on the first intermediate code, first assembly code including first assembly instructions to execute the first subset of the plurality of processes. The method may further include: (C) providing the first assembly code to the quantum execution hardware. The method may further include, at the quantum execution hardware, executing the first assembly code. The method may further include: (D) generating, based on the first intermediate code, second assembly code including second instructions to execute the second subset of the plurality of processes. The method may further include: (E) providing the second assembly code to the classical execution hardware. The method may further include, at the classical execution hardware, executing the second assembly code.

One embodiment of the present invention is directed to a computer system which includes a first classical computer (e.g., the local computer 402), the first classical computer comprising at least one first processor and at least one first non-transitory computer-readable medium, the at least one first non-transitory computer-readable medium having computer program instructions stored thereon which, when executed by the at least one first processor, perform a method. The method may include: (A) optimizing first intermediate code generated by a compiler front-end for a computer programming language, thereby creating optimized intermediate code, the first intermediate code defining a plurality of processes. The optimizing may include: (A)(1) identifying, based on the first intermediate code, a first subset of the plurality of processes which are suited to execute on quantum execution hardware; (A)(2) generating a description of a quantum circuit to execute the first subset of the plurality of processes; (A)(3) optimizing the description of the quantum circuit to produce a description of an optimized quantum circuit; and (A)(4) identifying a second subset of the plurality of processes which are suited to execute on classical execution hardware. The operation (A)(3) may include compiling the description of the quantum circuit to produce the description of the optimized quantum circuit. The method may further include: (B) generating, based on the first intermediate code, first assembly code including first instructions to execute the first subset of the plurality of processes.

The system may further include the quantum execution hardware, and the method may further include: (C) providing the first assembly code to the quantum execution hardware. The method may further include, at the quantum execution hardware, executing the first assembly code. The method may further include: (D) generating, based on the first intermediate code, first assembly code including first instructions to execute the first subset of the plurality of processes. The system may further include the classical execution hardware, and the method may further include: (E) providing the second assembly code to the classical execution hardware. The method may further include, at the classical execution hardware, executing the second assembly code.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a 2n×2n complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
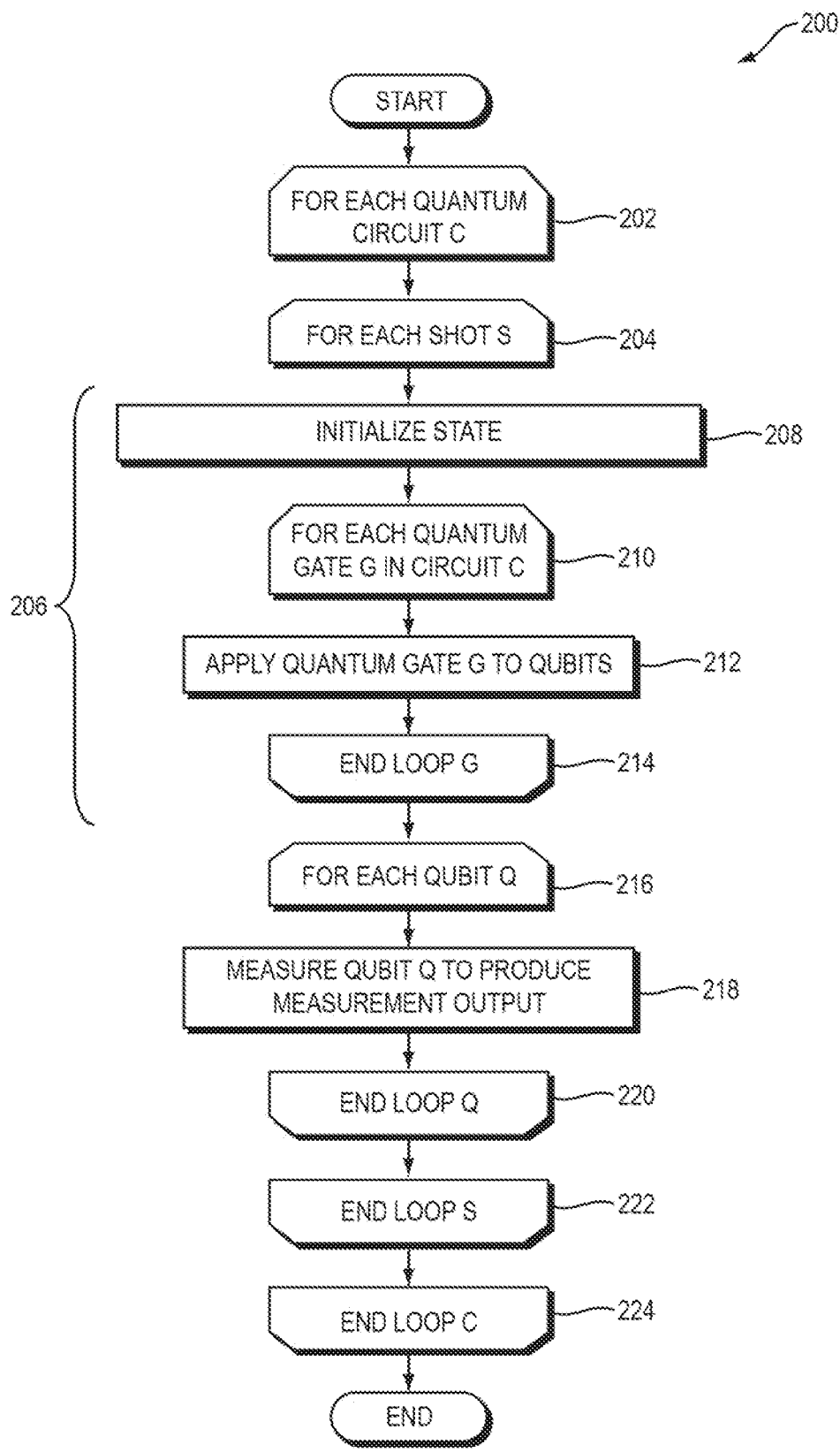
FIG. 2A is a flowchart of a method performed by the quantum computer of FIG. 1 according to one embodiment of the present invention.
Figure 2B:
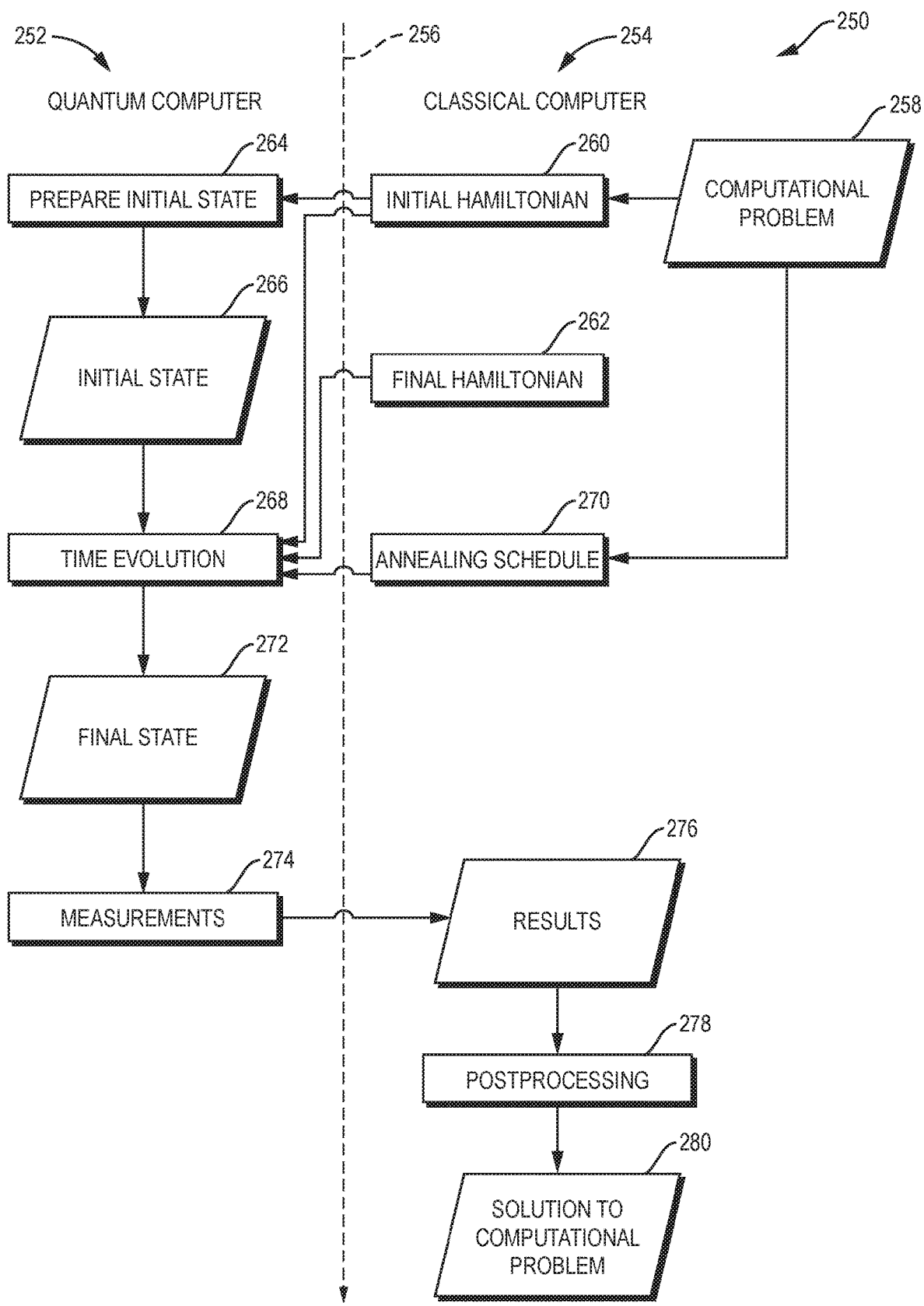
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original computational problem 258. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signal 114 from the measurement unit 110 to the control unit 106. Such feedback signal 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, operation 206). A special case of state preparation is "initialization," also referred to as a "reset operation," in which the initial state is one in which some or all of the qubits 104 are in the "zero" state i.e., the default single-qubit state (FIG. 2, operation 208). More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A as elements of "state preparation" may instead be characterized as elements of gate application. Conversely, for example, some or all of the components and operations that are illustrated in FIGS. 1 and 2A as elements of "gate application" may instead be characterized as elements of state preparation. As one particular example, the system and method of FIGS. 1 and 2A may be characterized as solely performing state preparation followed by measurement, without any gate application, where the elements that are described herein as being part of gate application are instead considered to be part of state preparation. Conversely, for example, the system and method of FIGS. 1 and 2A may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
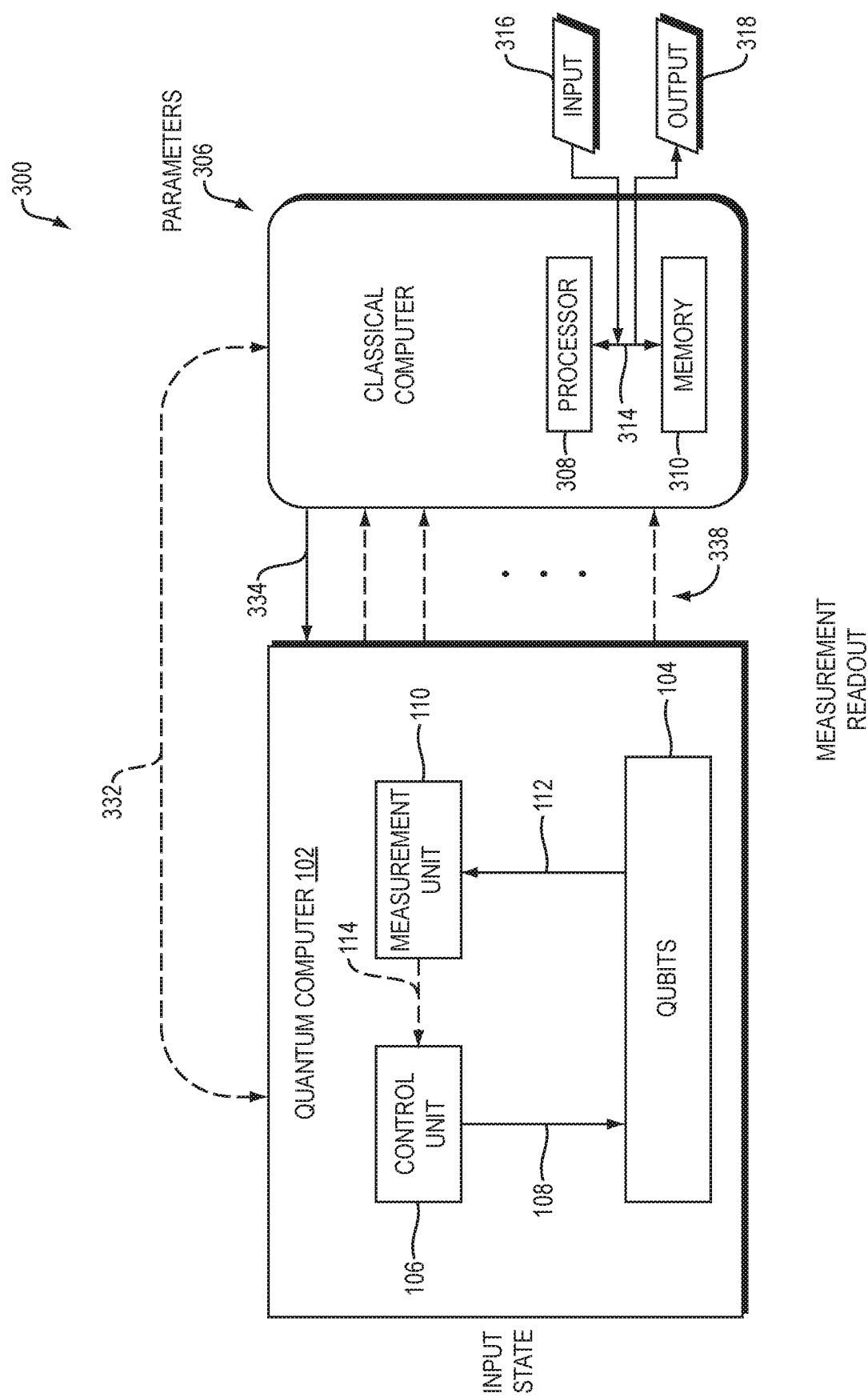
FIG. 3 is a diagram of a hybrid quantum-classical computer according to one embodiment of the present invention.

Referring to FIG. 3, a diagram is shown of a hybrid quantum-classical computer (HQC) 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. 1 and 2A) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum-classical (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention include a quantum processing unit (QPU), which includes physical hardware for realizing quantum computation, such as ion traps, superconducting circuits, or photonic circuits. The functions performed by such a QPU are not capable of being emulated manually or mentally, except possible for trivial computations.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

What is claimed is:

1. A computer-implemented method comprising:
   (A) at a classical computer, optimizing non-optimized intermediate code generated by a compiler front-end for a computer programming language, thereby creating optimized intermediate code, the non-optimized intermediate code defining a plurality of processes, the optimizing comprising:
   (A) (1) identifying, based on tokens in the non-optimized intermediate code that were generated based on instructions marked as quantum instructions, a first subset of the plurality of processes;
   (A) (2) generating a description of a quantum circuit to execute the first subset of the plurality of processes;
   (A) (3) optimizing the description of the quantum circuit to produce a description of an optimized quantum circuit; and
   (A) (4) identifying, based on tokens in the non-optimized intermediate code that were generated based on instructions marked as classical instructions, a second subset of the plurality of processes.

2. The method of claim 1, wherein (A) (3) comprises compiling the description of the quantum circuit to produce the description of the optimized quantum circuit.

3. The method of claim 2, further comprising:
   (B) generating, based on the non-optimized intermediate code, first assembly code including first assembly instructions to execute the first subset of the plurality of processes.

4. The method of claim 3, further comprising:
   (C) providing the first assembly code to quantum execution hardware.

5. The method of claim 4, further comprising, at the quantum execution hardware, executing the first assembly code.

6. The method of claim 4, further comprising:
   (D) generating, based on the non-optimized intermediate code, second assembly code including second assembly instructions to execute the second subset of the plurality of processes.

7. The method of claim 6, further comprising:
   (E) providing the second assembly code to classical execution hardware.

8. The method of claim 7, further comprising, at the classical execution hardware, executing the second assembly code.

9. A computer system comprising:
   a classical computer comprising at least one processor and at least one non-transitory computer-readable medium, the at least one non-transitory computer-readable medium having computer program instructions stored thereon which, when executed by the at least one processor, perform a method comprising:
   (A) optimizing non-optimized first intermediate code generated by a compiler front-end for a computer programming language, thereby creating optimized intermediate code, the first non-optimized intermediate code defining a plurality of processes, the optimizing comprising:
   (A) (1) identifying, based on tokens in the non-optimized first intermediate code that were generated based on instructions marked as quantum instructions, a first subset of the plurality of processes which arc suitcd t cxccutc n quantum cxccuti n hardwarc;
   (A) (2) generating a description of a quantum circuit to execute the first subset of the plurality of processes;
   (A) (3) optimizing the description of the quantum circuit to produce a description of an optimized quantum circuit; and
   (A) (4) identifying, based on tokens in the non-optimized intermediate code that were generated based on instructions marked as classical instructions, a second subset of the plurality of processes.

10. The system of claim 9, wherein (A) (3) comprises compiling the description of the quantum circuit to produce the description of the optimized quantum circuit.

11. The system of claim 10, wherein the method further comprises:
    (B) generating, based on the non-optimized intermediate code, first assembly code including instructions to execute the first subset of the plurality of processes.

12. The system of claim 11, further comprising quantum execution hardware, and wherein the method further comprises:
    (C) providing the first assembly code to the quantum execution hardware.

13. The system of claim 12, wherein the method further comprises, at the quantum execution hardware, executing the first assembly code.

14. The system of claim 12, wherein the method further comprises:
(D) generating, based on the non-optimized intermediate code, second assembly code including second assembly instructions to execute the second subset of the plurality of processes.

15. The system of claim 14, further comprising classical execution hardware, and wherein the method further comprises:
(E) providing the second assembly code to the classical execution hardware.

16. The system of claim 15, wherein the method further comprises, at the classical execution hardware, executing the second assembly code.

* * * * *